United States Patent
Stengel et al.

(10) Patent No.: US 6,334,371 B1
(45) Date of Patent: Jan. 1, 2002

(54) CONTROL DEVICE FOR A VARIABLE SPEED GEAR

(75) Inventors: Martin Stengel, Urbach; Günter Wörner, Kernen, both of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/486,263

(22) PCT Filed: Aug. 7, 1998

(86) PCT No.: PCT/EP98/05020

§ 371 Date: Jun. 13, 2000

§ 102(e) Date: Jun. 13, 2000

(87) PCT Pub. No.: WO99/10665

PCT Pub. Date: Mar. 4, 1999

(30) Foreign Application Priority Data

Aug. 27, 1997 (DE) .................................. 197 37 305

(51) Int. Cl.$^7$ ............................. B60K 17/04; F16H 59/00
(52) U.S. Cl. .................................... 74/473.12; 74/335
(58) Field of Search ...................... 74/473.12, 473.36, 74/473.37, 473.11, 335, 89.15

(56) References Cited

U.S. PATENT DOCUMENTS

| | | | |
|---|---|---|---|
| 4,297,910 A | | 11/1981 | Myers |
| 5,251,503 A | * | 10/1993 | Morris et al. ............... 74/335 X |
| 5,357,821 A | | 10/1994 | Haka et al. |
| 5,823,053 A | * | 10/1998 | Stengel et al. ........ 74/473.12 X |
| 5,916,326 A | * | 6/1999 | Tischer .................. 74/473.12 X |
| 5,979,262 A | * | 11/1999 | Doelling et al. .......... 74/473.22 |
| 6,058,795 A | * | 5/2000 | Ottenbruch et al. ....... 74/335 X |
| 6,062,097 A | * | 5/2000 | Imao et al. ................. 74/473.12 |
| 6,065,363 A | * | 5/2000 | Schaller ..................... 74/473.12 |
| 6,105,448 A | * | 8/2000 | Borschert et al. .............. 74/335 |
| 6,155,129 A | * | 12/2000 | Dorfschmid et al. ..... 74/473.12 |
| 6,170,352 B1 | * | 1/2001 | Neubauer et al. .......... 74/355 X |

FOREIGN PATENT DOCUMENTS

| | | |
|---|---|---|
| EP | 195 27 893 | 10/1996 |
| EP | 0 828 099 | 3/1998 |

* cited by examiner

*Primary Examiner*—Charles A Marmor
*Assistant Examiner*—Roger Pang
(74) *Attorney, Agent, or Firm*—Crowell & Moring LLP

(57) ABSTRACT

A gear-shift device for a change-speed gearbox, includes a shift actuator, a selection actuator, an actuator which is arranged such that it can be displaced exclusively axially with regard to a housing, an auxiliary transmission for converting a rotary motion into a reciprocating motion, a brake which is connected to the selection actuator and an engageable and disengageable locking device. These components are arranged in terms of their action in such a manner that two of the three actuators are arranged fixed in terms of movement with respect to one another and are connected to the third actuator by the auxiliary transmission. The selection actuator is fixed either in a rotationally fixed or axially undisplaceable manner with regard to the housing. A fixed slotted shift guide can be provided singly or together with a slotted change-interlock guide for the shift actuator, with the guide plate being used as a brake and locking device.

10 Claims, 3 Drawing Sheets

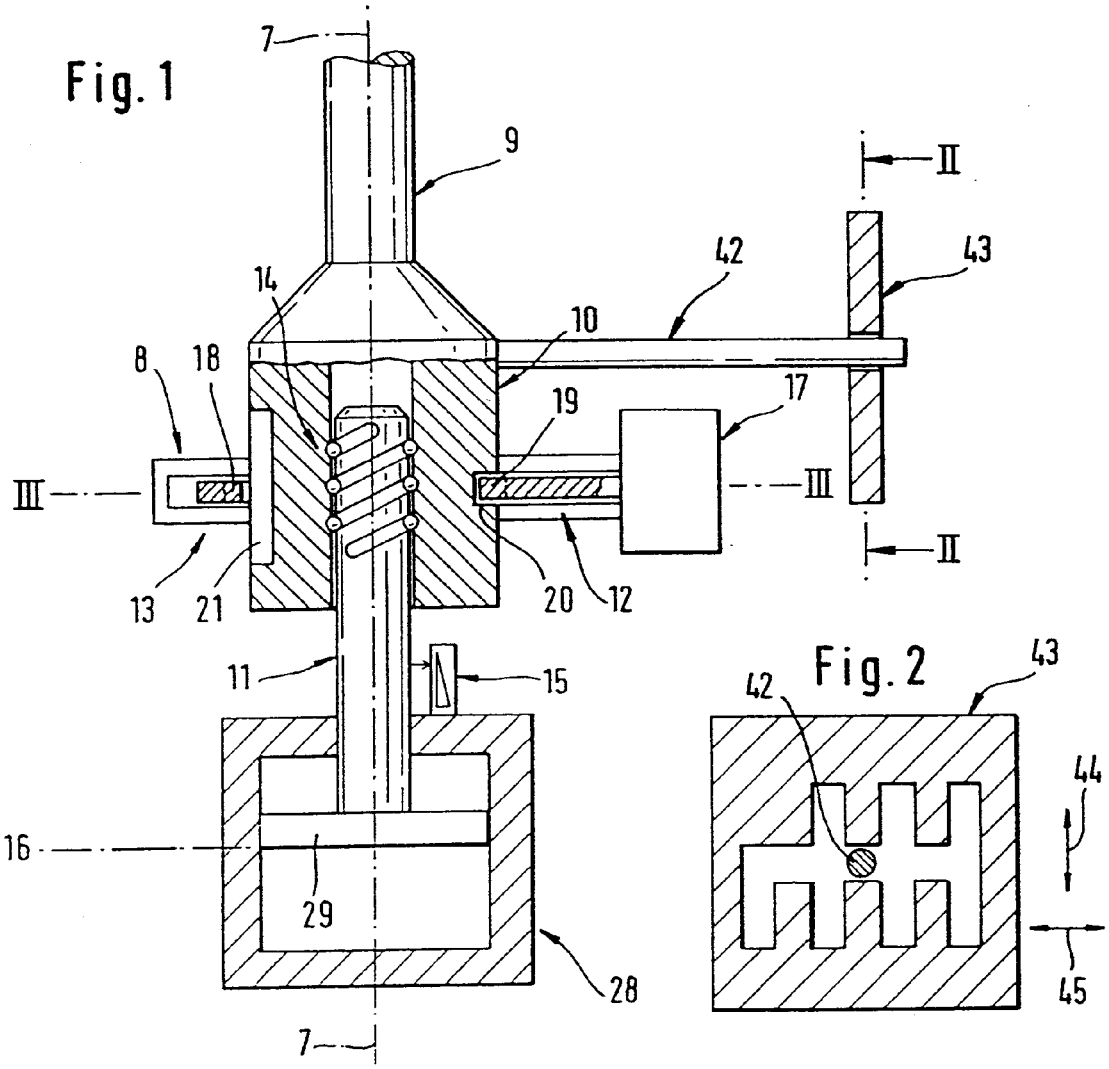
Fig. 1
Fig. 2
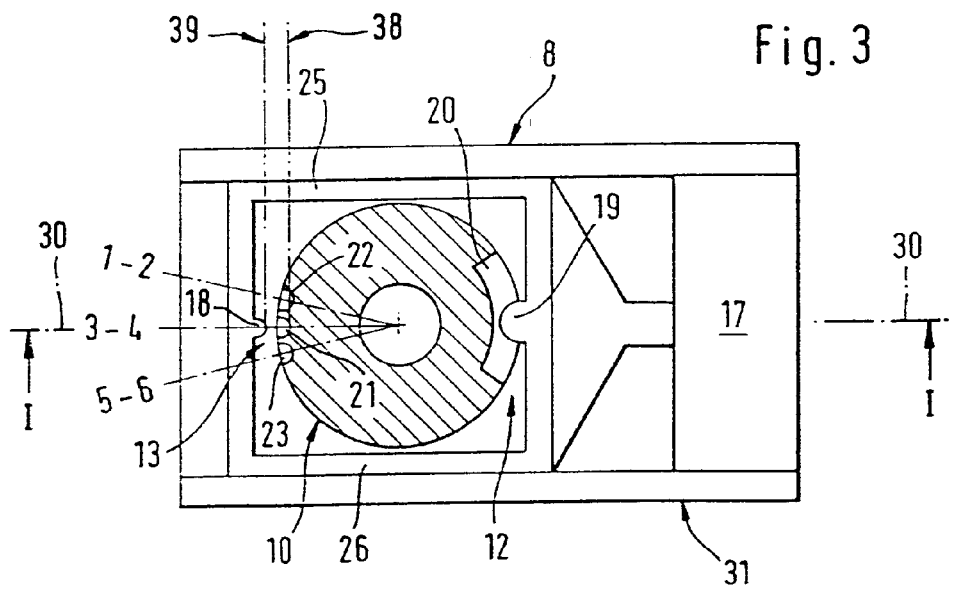
Fig. 3

CONTROL DEVICE FOR A VARIABLE
SPEED GEAR

BACKGROUND OF THE INVENTION

This application claims the priority of German Patent Application No. 197 37 305.4 filed Aug. 27, 1997 and PCT/EP98/05020, filed Aug. 7, 1998, the disclosures of which are expressly incorporated by reference herein.

The present invention relates to a gear-shift device for a change-speed gearbox, and more particularly, to a gear-shaft device having a shift actuator which is arranged rotatably and axially displaceably with respect to a central axis of a housing, having a selection actuator which is coaxial with respect to the central axis and is arranged rotatably relative to the housing, having an actuator which is coaxial with respect to the central axis and is arranged such that it can be displaced exclusively axially relative to the housing, having means for fixing the selection actuator with regard to the housing in the longitudinal directions of the central axis, having an engageable and disengageable brake for fixing the selection actuator with regard to the housing in the circumferential directions of the central axis, having an auxiliary transmission for converting a reciprocating motion into a rotary motion.

A gear-shift device is described in DE 196 10 104 A1.

In this known gear-shift device, a selection control sleeve is arranged concentrically to a shift control shaft and is connected to the latter by the auxiliary transmission in the form of a guide plate/guide pin arrangement. The shift control shaft is connected, by a rod-like actuator, to a pressure-medium servomotor of the axial-piston type, while an electromagnet is used for actuating the brake acting on the selection control sleeve. The selection control sleeve is fixed immovably with regard to the housing in the longitudinal directions of the central axis, while the shift control shaft is latched by a latching device in its significant rotation-angle positions assigned to a respective shift gate for shifting one or two gears.

In this known gear-shift device according to DE 196 10 104 A1, it is already possible to shift gear from a current gear into a new gear while skipping at least one intermediate gear by causing the shift control shaft to execute a linear actuation motion which oscillates about the middle significant position and thus alternately engaging and disengaging the brake of the actuation control sleeve when passing through the middle significant position. In order, when skipping gears, to avoid collision between the synchronization devices assigned to these gears and the shift control shaft, a certain free travel is provided for the shift control shaft.

DE 41 37 142 A1 describes a gear-shift device of another type, in which an electric motor is connected, by way of a screw mechanism for converting a rotary motion into a reciprocating motion, to a gear-shift rod which is mounted rotatably and axially displaceably in a housing and can be fixed with regard to the housing by an engageable and disengageable brake device. Thereby, the gear-shift rod is arranged to be exclusively axially displaceable in the engaged position of the brake, but in the disengaged position of the brake is arranged to be both axially displaceable and rotatable with regard to the housing. The gear-shift rod is directly connected to the motor shaft of the electric motor by a coupling which can be engaged and disengaged in opposite directions to the brake. When changing between selecting and shifting, both coupling and brake have to be changed over and the electric motor stopped.

DE 43 09 027 A1 describes yet a further gear-shift device of another type, in which a gear-shift shaft, which is arranged rotatably and axially displaceably with regard to a pressure-medium cylinder, can be moved by a first axial piston of the pressure-medium cylinder directly in the directions of the gear-shift shaft axis for shifting the gears. A second axial piston of the pressure-medium cylinder, with the aid of an auxiliary transmission for converting a reciprocating motion into a rotary motion with regard to the gear-shift shaft axis, causes the gear-shift shaft to perform rotary movements for selecting the shift gates.

SUMMARY OF THE INVENTION

An object underlying the present invention essentially consists in allowing a gear-shift device likewise to skip at least one intermediate gear when shifting from a current gear into a new gear but dispensing with or largely avoiding special free travel for the shift actuator.

This object has been advantageously achieved according to the present invention by a gear-shift device in which the shift actuator, when actuated into the rotation-angle position associated with the new gear, remains fixed immovably by the locking device in the longitudinal directions of the central axis of the housing. Thus, special free travel for the shift actuator, in order to avoid collision with synchronization devices during this actuation, is not required, because the linear movement required for selecting the new rotation-angle position is performed only by the third actuator, which is arranged such that it can be displaced exclusively axially with regard to the housing.

Another object underlying the present improve the known gear-shift device in such a way that the process reliability of the shift sequence is improved.

According to the present invention, the foregoing object has been achieved in an advantageous manner by proving that reciprocating motion into a rotary motion, and in which two of the three actuators are both arranged such that they are fixed in terms of movement with respect to one another, at least in the longitudinal directions of the central axis, and are connected to the third actuator by the auxiliary transmission, and an engageable and disengageable locking device is connected in terms of action both to the selection actuator and to the brake in such a manner that the selection actuator can be fixed with regard to the housing alternately either exclusively in the circumferential directions or exclusively in the longitudinal directions of the central axis, and in which the selection actuator is connected by the auxiliary transmission to the actuator which is arranged such that it can be displaced exclusively axially with regard to the housing, according to main patent 196 35 866, characterized in that a guide pin (42) is guided in a fixed shift guide plate (43) which represents the shift pattern of a manual shift lever, and in that the guide pin (42) is arranged in a manner fixed in terms of movement with regard to the shift actuator (9) and radially to the central axis (7—7).

The fixed slotted shift guide, in which a guide pin arranged in a manner fixed in terms of motion with regard to the shift actuator is guided, ensures that it is only possible to change between shifting and selection in the positions determined by the internal structure of the gearbox. This improves the process reliability of the shift sequence. Moreover, it is possible to simplify the internal shift mechanism of the gearbox since the latching elements for the shifting and selection movement on the shift actuator can be omitted.

In a special embodiment of the gear-shift device according to the invention, the selection of the shifting or selection plane is incorporated into the operation of a slotted change-interlock guide interacting with a guide pin at the shift actuator. Depending on the respective end position of the slotted change-interlock guide, the shift actuator is free to move either only in the direction of selection or only in the direction of shifting. A sensor system for the positionally correct switching of the slotted change-interlock guide can be placed in the slotted change-interlock guide to minimize system tolerances. The slotted change-interlock guide can furthermore be controlled in such a way that the impulse produced by the change of direction between shifting and selection can be absorbed, thus keeping down mechanical loading.

BRIEF DESCRIPTION OF THE DRAWINGS

Other objects, advantages and novel features of the present invention will become apparent from the following detailed description of the invention when considered in conjunction with the accompanying drawings.

FIG. 1 shows a first embodiment of a gear-shift device according to the invention illustrated in an axial section containing the central axis along line I—I in FIG. 3, FIG. 2 shows a cross-section of the gear-shift device of FIG. 1 along line II—II, FIG. 3 shows the gear-shift device of FIG. 1, illustrated in an axial section containing the central axis along line III—III.

DETAILED DESCRIPTION OF THE DRAWINGS

Figure 1A:
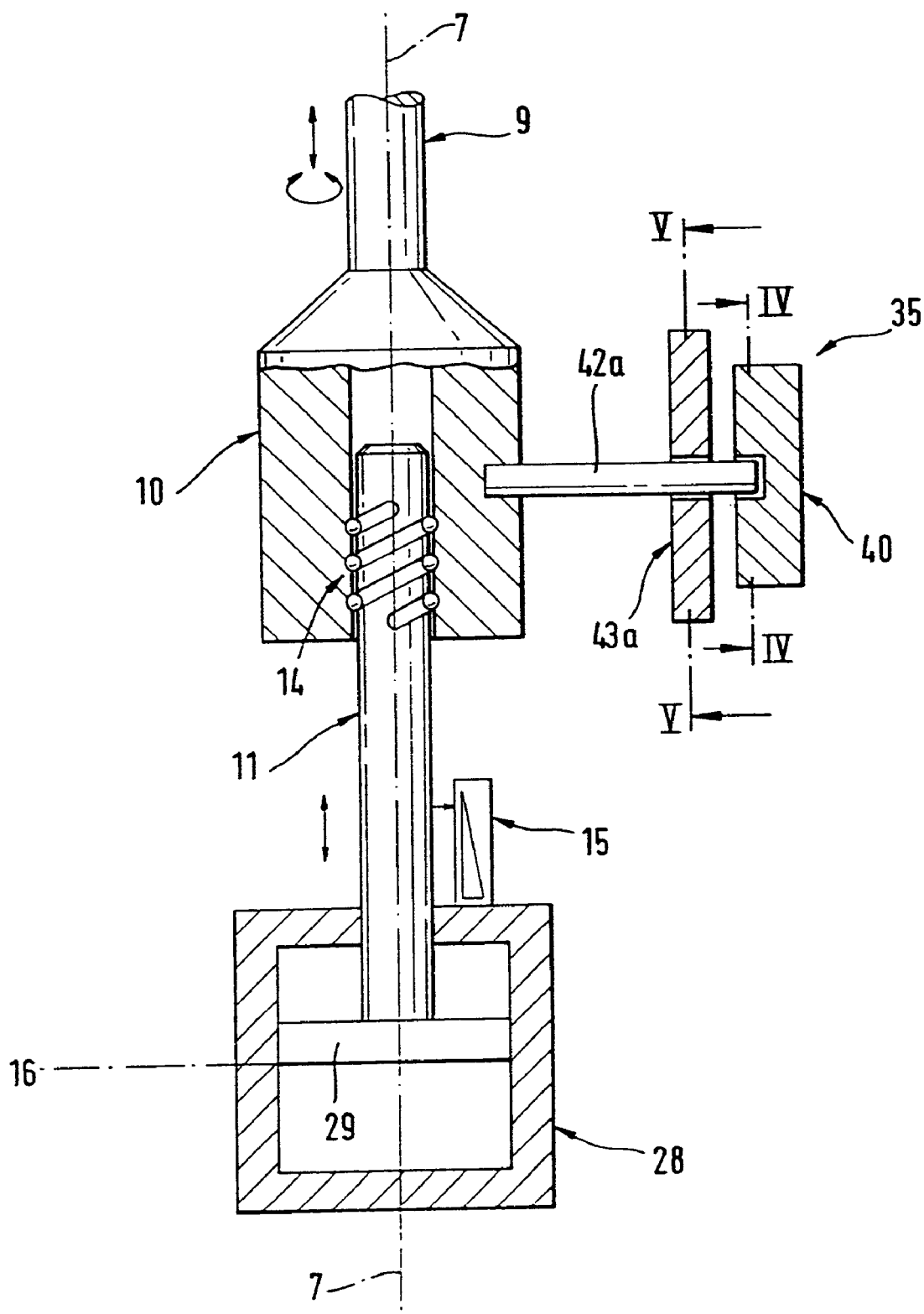
FIG. 1a shows a special embodiment of a gear-shift device according to the invention in a representation corresponding to FIG. 1.
Figure 4A:
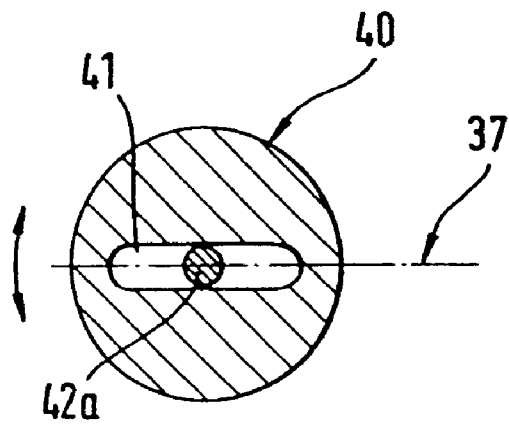
FIG. 4a shows a partial longitudinal section through the gear-shift device of FIG. 1a along line IV—IV, in a first shift state.
Figure 4B:
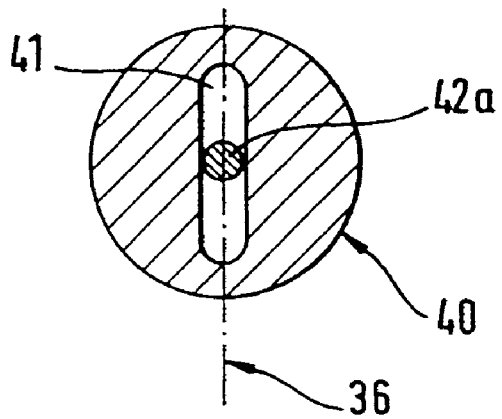
FIG. 4b shows a partial longitudinal section through the gear-shift device of FIG. 1a along line IVIV, in a second shift state.
Figure 5:
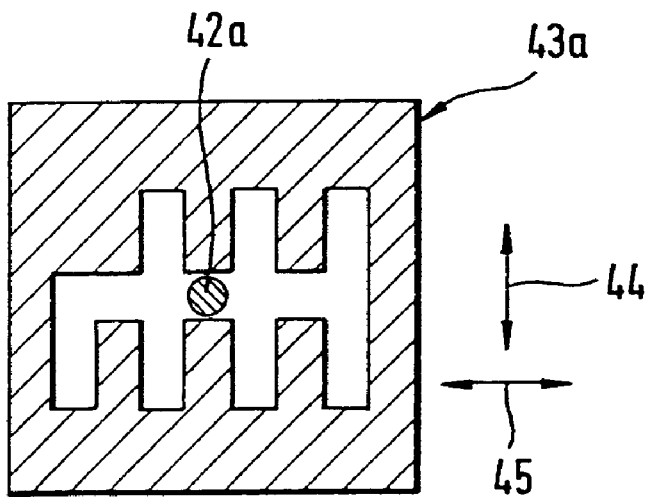
FIG. 5 shows a partial longitudinal section through the gear-shift device of FIG. 1a along line V—V.

Referring to the first embodiment of FIGS. 1 to 3, a shift actuator 9, in the form of a shaft, a selection actuator 10 in the form of a hollow shaft or sleeve, a rod-like actuator 11 and a pressure-medium servomotor 28 with a double-acting axial piston 29 are arranged coaxially with a central axis 7—7 of a housing 8 (not shown specifically) of a change-speed gearbox (likewise not shown specifically).

The shift actuator 9 is designed to be fixed in terms of movement with regard to the selection actuator 10, or is integral therewith. The selection actuator 10 is connected, by way of an auxiliary transmission 14 in the form of a screw mechanism for converting a reciprocating motion into a rotary motion, to the actuator 11 which is arranged such that it can be displaced exclusively axially with regard to the housing 8 and is for its part connected fixedly in terms of movement to the axial piston 29.

The shift actuator 9 can be actuated into a significant rotation-angle position (FIG. 3), in which an axial groove 21 on the outer circumference of the selection actuator 10 lies in a reference plane 30—30 of the housing 8. The plane contains the central axis 7—7. The axial groove 21 is assigned to the shift gate 3-4 for optionally engaging forward gears 3 and 4. By actuating the shift actuator 9 in the significant rotation-angle position in the directions of the central axis 7—7, the forward gear 3 or 4 is either engaged or disengaged.

The shift actuator 9 can be actuated into a further significant rotation-angle position (again referring to FIG. 3), in which an axial groove 22 on the outer circumference of the selection actuator 10 lies in the reference plane 30—30. The axial groove 22 is assigned to the shift gate 1-2 for optionally shifting the forward gears 1 and 2. By actuating the shift actuator 9, which is in the significant rotation-angle position, in the directions of the central axis 7—7, the forward gear 1 or 2 is either engaged or disengaged.

The shift actuator 9 can be actuated into a third significant rotation-angle position (again shown in FIG. 3), in which an axial groove 23 on the outer circumference of the selection actuator 10 lies in the reference plane 30—30. The axial groove 23 is assigned to the shift gate 5-6 for optionally shifting the forward gears 5 and 6. By actuating the shift actuator 9, which is in the significant rotation-angle position, in the directions of the central axis 7—7 the forward gear 5 or 6 is either engaged or disengaged.

To actuate the shift actuator 9 into the respective significant rotation-angle position, the selection actuator 10 is fixed with regard to the housing 8, in the directions of the central axis 7—7, by an engageable and disengageable locking device 12. A locking engagement member 19 is engaged in a circumferential groove 20 on the outer circumference of the selection actuator 10 in such a manner that the selection actuator 10 is fixed so as to be undisplaceable exclusively axially.

To actuate the shift actuator 9 in the directions of the central axis 7—7 for the purpose of shifting the gears, the locking device 12 is disengaged and a brake 13, which is connected to the selection actuator 10, is engaged. A brake engagement member 18 passes into the axial groove 21, 22 or 23 which is respectively situated in the reference plane 30—30 in a rotationally fixed but axially displaceable manner relative to the selection actuator 10.

The axial piston 29 has a significant stroke position 16, in which the shift actuator 9, in the unactuated position, adopts a rest position, which is centered by return springs. The rest position is at the transition between a predetermined shift gate and a neutral selection gate of the shift pattern of a manual shift lever. In the rest position, the shift actuator 9 is situated in the significant rotation-angle position of the predetermined shift gate, with the brake engagement member 18 passing into the associated axial groove 21.

In order to ensure that the locking device 12 and the brake 13 can be actuated only in the significant stroke position 16 of the axial piston 29, a displacement sensor 15, which indicates the stroke position 16, is connected to a device which controls a servomotor 17 of the brake 13.

In the gear-shift device of the first embodiment, the circumferential groove 20 of the locking device 12 is arranged diametrically opposite, with regard to the central axis 7—7, to the axial grooves 21 to 23 of the brake 13. The brake engagement member 18 and the locking engagement member 19 are connected to one another by at least one hoop-like linkage 25 and/or 26 which surrounds the selection actuator 10. The linkages are dis-placeably guided parallel to the reference plane 30—30 in a frame-like guide 31 which is fixed in terms of movement relative to the housing 8.

The linkage-coupling between locking device 12, brake 13 and servomotor 17 is made such that the selection actuator 10 is arranged to be either exclusively axially immovable or exclusively rotationally fixed with regard to the housing 8.

A guide pin 42 is arranged in a manner fixed in terms of movement with regard to the shift actuator 9 and radially with regard to the central axis 7—7. The guide pin 42 is guided in a fixed shift gate 43 designed in accordance with the shift pattern of a manual shift lever.

The method of operation of the gear-shift device is explained below with reference to a gear-shift sequence.

When shifting up from second gear into third gear, the shift actuator 9 initially adopts that rotation-angle position in which the axial groove 22 assigned to the shift gate 1-2 is situated in the reference plane 30—30 and accommodates the brake engagement member 18. By actuating the servomotor 28 into its significant stroke position 16, the second gear is disengaged and shift actuator 9 is moved into the selection gate in the direction of the central axis 7—7.

On reaching the significant stroke position 16, the displacement sensor 15 reverses the servomotor 17 of the brake 13. Thereby, the selection actuator 10 is fixed in the longitudinal directions of the central axis 7—7 with regard to the housing 8 by the locking device 12. A subsequent controlled actuation of the actuator 11 by the servomotor 28 leads to a rotary movement of the shift actuator 9 into that significant rotation-angle position in which the axial groove 21 assigned to the shift gate 3-4 lies in the reference plane 30—30. When the shift actuator 9 reaches this rotation-angle position, the servomotor 17 is reversed again. As a result, the brake engagement member 18 engages in the axial groove 21 and the locking engagement member 19 disengages from the circumferential groove 20. When the servomotor 17 reaches this position, the shift actuator 9 is actuated further by the servomotor 28, in the directions of the central axis 7—7, beyond the selection gate and as a result third gear is engaged.

This slotted-guide mechanism 42, 43 for the shift actuator 9 ensures that it is only possible to switch between selection direction 45 and shifting direction 44 in the positions predetermined by the internal structure of the gearbox. Referring to the special embodiment in FIGS. 1a, 4a, 4b and 5, a guide pin 42a is arranged in a manner fixed in terms of movement with regard to the shift actuator 9 and radially to the central axis 7—7. The guide pin 42a is guided in a fixed slotted shift guide 43a designed in accordance with the shift pattern of a manual shift lever and is positively coupled to a slotted change-interlock guide 35. This slotted change-interlock guide 35 has a slotted disc 40 which can be switched between two rotation-angle end positions 36, 37 and has a rectilinear guide slot 41 for the guide pin 42a. In rotation-angle position 36, the guide pin 42a is in such a position relative to the fixed slotted shift guide 43a that the selection movements 45 of the guide pin 42a along a selection portion of the guide are blocked and shifting movements 44 of the guide pin 42a are enabled. In rotation-angle end position 37 of the slotted disc 40, the guide slot 41 is in a position relative to the slotted shift guide 43a such that the shifting movements 44 of the guide pin 42a along a respective shifting portion of the guide are blocked and the selecting movements 45 of the latter are enabled.

The slotted change-interlock guide 35 is or has been actuated into the rotation-angle end position 36 when the guide pin 42a reaches the shift gate containing the gear to be engaged or is in the latter.

The slotted change-interlock guide 35 is or has been actuated into the rotation-angle end position 37 when the guide pin 42a is in the selection portion of the guide but not in the region of the shift gate containing the gear to be engaged.

The slotted change-interlock guide 35 is switched over in the same way as the braking and locking device 12/13 of the first embodiment. The rotation-angle end position 36 in FIG. 4b corresponds to the end position 38 in FIG. 3 and the end position 39 in FIG. 3 corresponds to the rotation-angle end position 37 in FIG. 4a.

As a result, an actuation of the shift actuator 9 by the axial piston 29 via the screw mechanism 14 has the same effect in both embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Gear-shift device for a change-speed gearbox, comprising a shift actuator arranged rotatably and axially displaceably with respect to a central axis of a housing, a selection actuator coaxial with respect to the central axis and arranged rotatably relative to the housing, an actuator coaxial with respect to the central axis and arranged to be displaced exclusively axially relative to the housing, means for fixing the selection actuator with regard to the housing in longitudinal directions of the central axis, an engageable and disengageable brake for fixing the selection actuator with regard to the housing in the circumferential directions of the central axis, an auxiliary transmission for converting a reciprocating motion into a rotary motion, when two of the three actuators are arranged to be fixed in terms of movement with respect to one another, at least in the longitudinal directions of the central axis, and are connected to the third actuator by the auxiliary transmission, and an engageable and disengageable locking device is connected in terms of action both to the selection actuator and to the brake in such a manner that the selection actuator is fixable with regard to the housing alternately either exclusively in the circumferential directions or exclusively in the longitudinal directions of the central axis, the selection actuator is connected by the auxiliary transmission to the actuator which is arranged to be displaced exclusively axially with regard to the housing, a guide pin is guided in a fixed shift guide plate which represents a shift pattern of a manual shift lever, the guide pin being arranged in a manner fixed in terms of movement with regard to the shift actuator and radially to the central axis.

2. Gear-shift device according to claim 1, wherein a sensor for determining a significant middle position of the actuator is arranged to be displaced exclusively axially with regard to the housing, and is arranged and interacts with a servomotor for actuating the brake in such a manner that the brake is engaged and disengaged exclusively in the significant position of the actuator.

3. Gear-shift device according to claim 1, wherein the selection actuator has a circumferential groove concentric to the central axis and in which a locking engagement member of the locking device is engageable, which locking engagement member is arranged fixed in terms of movement with regard to an engageable and disengageable brake engagement member of the brake.

4. Gear-shift device according to claim 3, wherein the circumferential groove is arranged diametrically opposite, with regard to the central axis, to axial grooves of the selection actuator, in which axial grooves the brake engagement member is engageable, and the brake engagement member and the locking engagement member are connected by at least one hoop-like linkage which surrounds the selection actuator.

5. Gear-shift device according to claim 1, wherein the shift actuator is connected in a motion-dependent manner to a slotted change-interlock guide which is configured as a brake and locking device and is switchable between two end positions, and the rotary movements of the shift actuator are blockable in one end position and the reciprocating movements of the shift actuator are blockable in the other end position of the slotted change-interlock guide by a guide pin which is connected to the shift actuator and engages in the slotted change-interlock guide.

6. Gear-shift device according to claim 5, wherein the slotted change-interlock guide has a slotted disc actuable between two rotation-angle end positions offset by 90° relative to one another, and a rectilinear guide slot which, in one rotation-angle end position, blocks the selection movements and, in the other rotation-angle end position, blocks the shifting movements of the shift actuator.

7. Gear-shift device according to claim 6, wherein the guide pin of the fixed slotted shift guide (43*a*) further engages in the guide slot of the slotted change-interlock guide.

8. Gear-shift device according to claim 1 wherein a screw mechanism is comprises the auxiliary transmission.

9. Gear-shift device according to claim 1 characterized wherein the actuator is arranged to be displaced exclusively axially with regard to the housing is connected to a pressure-medium servomotor of the axial-piston type.

10. Gear-shift device according to claim 2, wherein the servomotor for fixing the selection actuator with regard to the housing in the circumferential directions of the central axis is an electromagnet.

* * * * *